United States Patent
Palffy-Muhoray et al.

(10) Patent No.: US 6,656,384 B1
(45) Date of Patent: Dec. 2, 2003

(54) PRODUCTION OF FILAMENTS VIA PHASE SEPARATION AND POLYMERIZATION

(75) Inventors: Peter Palffy-Muhoray, Kent, OH (US); Liang-Chy Chien, Stow, OH (US); Gongjian Hu, Kent, OH (US)

(73) Assignee: Kent State University, Kent, OH (US)

( * ) Notice: Subject to any disclaimer, the term of this patent is extended or adjusted under 35 U.S.C. 154(b) by 201 days.

(21) Appl. No.: 09/640,625

(22) Filed: Aug. 17, 2000

Related U.S. Application Data

(63) Continuation of application No. 09/090,740, filed on Jun. 4, 1998, now abandoned.

(51) Int. Cl.$^7$ .............................................. C09K 19/52
(52) U.S. Cl. ..................................... 252/299.01; 560/56
(58) Field of Search ....................... 252/299.63, 299.64, 252/299.65, 299.66, 299.67, 299.01, 299.3; 560/56

(56) References Cited

U.S. PATENT DOCUMENTS

| | | | | |
|---|---|---|---|---|
| 5,670,083 A | * | 9/1997 | Akashi et al. ......... | 252/299.01 |
| 5,891,357 A | * | 4/1999 | Akashi et al. ......... | 252/299.01 |
| 6,180,028 B1 | * | 1/2001 | Hotaka et al. ......... | 252/299.66 |

FOREIGN PATENT DOCUMENTS

| | | | | |
|---|---|---|---|---|
| DE | 44 34 976 | * | 4/1996 | ......... C07C/255/54 |
| GB | 2 002 767 | * | 2/1979 | ............. G02F/1/13 |
| JP | 62-070407 | * | 3/1987 | ........... C08F/20/30 |
| JP | 7-17938 | * | 1/1995 | ......... C07C/255/54 |
| JP | 9-208957 | * | 8/1997 | ........... C09K/19/38 |
| JP | 10-62738 | * | 3/1998 | ............. G02F/1/13 |

* cited by examiner

Primary Examiner—Mark F. Huff
Assistant Examiner—Jennifer R. Sadula
(74) Attorney, Agent, or Firm—Renner, Kenner, Greive, Bobak, Taylor & Weber

(57) ABSTRACT

A polymerizable liquid crystalline monomer is described comprising a polymerizable first terminal group, a central portion, and a second terminal group, wherein the monomer is capable of filament formation. Filaments can form as a result of an isotropic to smectic phase transition and can subsequently be polymerized by photoinitiation, for example.

15 Claims, 1 Drawing Sheet

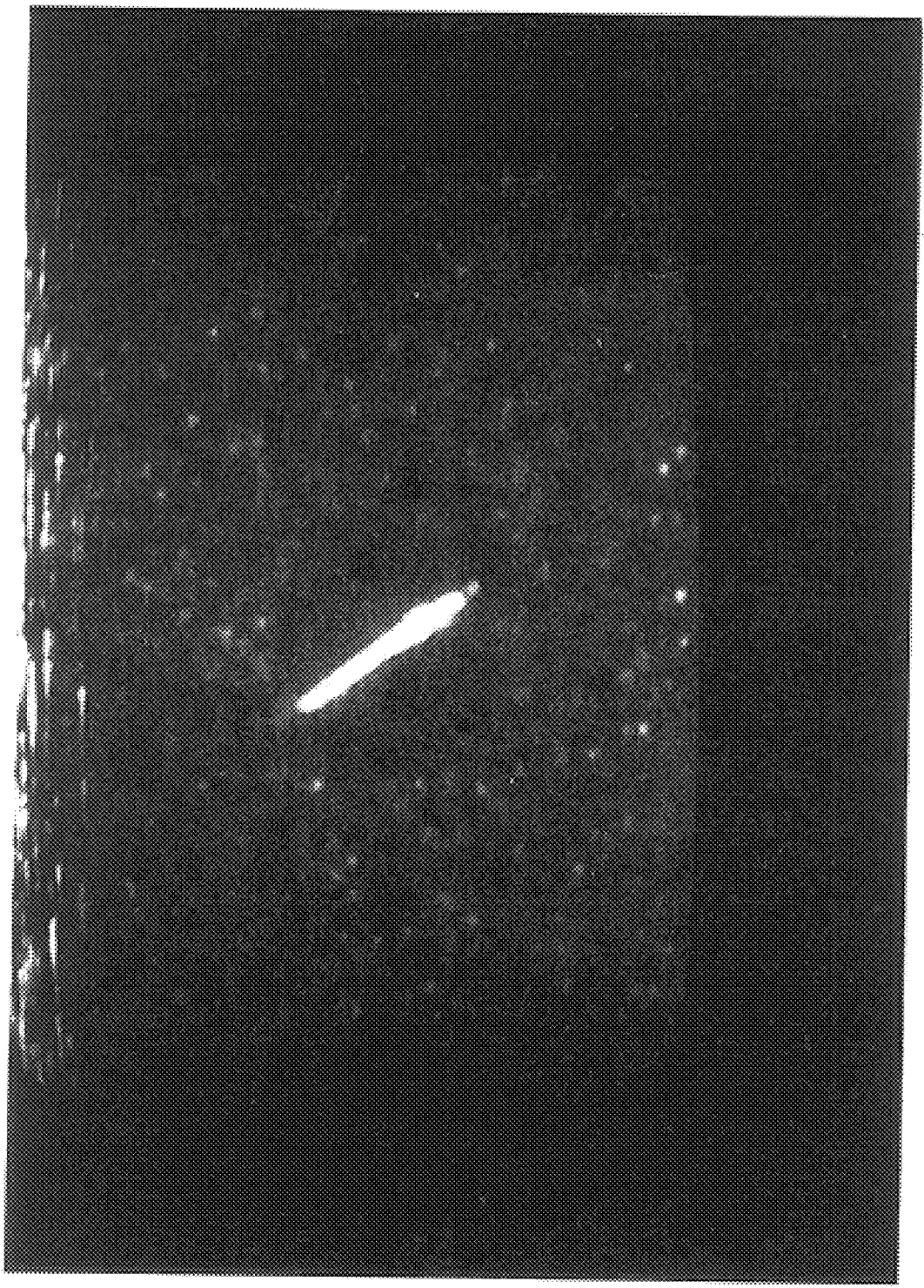

PRODUCTION OF FILAMENTS VIA PHASE SEPARATION AND POLYMERIZATION

CROSS REFERENCE OF RELATED APPLICATION

This is a continuation of application Ser. No. 09/090,740 filed Jun. 4, 1998 now abandoned.

The United States Government has a paid-up license in this invention and may have the right in limited circumstances to require the patent owner to license others on reasonable terms as provided for by the terms of Grant DMR 89-20147, awarded by the National Science Foundation.

TECHNICAL FIELD

This invention generally relates to polymerized filaments. More particularly, the present invention relates to polymerized liquid crystalline filaments. Specifically, the present invention relates to polymerized liquid crystalline filaments formed when a liquid crystalline solution undergoes a phase transition from the isotropic phase to the smectic phase. The present invention also relates to a method of polymerizing filaments.

BACKGROUND OF THE INVENTION

Many liquid crystals undergo a phase transition from the isotropic phase to the smectic phase, a phase where the molecules are orientationally ordered and arranged in layers. Cooling a liquid crystalline solution in an isotropic phase induces a transition into the smectic phase, usually in the form of batonnettes, which are small compact regions of the smectic phase. Upon further cooling, these batonnettes grow and, upon entering the smectic A phase, coalesce to form a focal conic structure.

In some systems of solute and solvent and in a narrow temperature range, instead of batonnettes, a filament of material in the smectic phase is observed to emerge from the isotropic phase. This filament typically grows by elongating everywhere—not only at the ends—while retaining substantially uniform thickness. As a result, the internal structure of the filament is concentric cylindrical layers of molecules around an axial isotropic core, making it highly ordered outside the core and substantially defect-free.

Defects are points or lines of diminished order. More specifically, they are the sites of abrupt change in the direction of the director of the liquid crystals. Almost always.

The lack of defects in liquid crystalline filaments, however, give the filaments highly desirable mechanical and optical properties. These properties are expected because highly ordered crystalline structures generally have high mechanical strength and minimal or no light scattering. Therefore, potential applications for these filaments include high strength fibers and textiles, optical wave guides and microelectronics.

Heretofore, no one has been able to take commercial advantage of these filaments because they are so concentration-and temperature-sensitive that they are usually short-lived, generally lasting only a couple hours in solution before either dissolving or collapsing into a globular structure. Therefore, there is a need for a liquid crystalline composition that forms filaments that can be preserved for a useful period of time.

SUMMARY OF THE INVENTION

It is therefore an object of the present invention to provide a compound that is capable of forming liquid crystalline filaments and is polymerizable.

It is another object of the present invention to provide a polymerized filament with an internal structure that is ordered and substantially defect-free.

It is a further object of the present invention to provide polymerized filaments with highly desirable mechanical and optical properties.

It is yet a further object of the present invention to provide a method of making polymerized filaments.

It is still yet a further object of the present invention to provide a method of making fibers from polymerized filaments.

At least one or more of the foregoing objects, together with the advantages thereof over the known art relating to polymerizable filaments, which shall become apparent from the specification which follows, are accomplished by the invention as hereinafter described and claimed.

In general, the present invention provides a polymerizable liquid crystalline monomer comprising a polymerizable first terminal group, a central portion, and a second terminal group, wherein the liquid crystalline monomer can be defined by formula (I):

(I)

where $R_1$ is a vinyl group or an epoxide, $R_2$ and $R_4$ are each independently selected from hydrogen or organic groups containing from 1 to about 20 carbon atoms; $R_5$ is a cyclohexyl or an aromatic group, preferably biphenyl, phenylcyclohexyl, cyclohexylcyclohexyl, phenylbenzoate, biphenylbenzoate, or phenylpyrimidine; $R_6$ is a polar group containing from 0 to about 18 carbon atoms and may contain one or more double bonds; and $R_3$ is either a bond, —CH=CH—, benzene, oxygen, sulfur, nitrogen, carboxylate, or

where Y is hydrogen or a lower alkyl group having from 1 to about 8 carbon atoms; and wherein the monomer is capable of filament formation.

The present invention also includes a method of making a polymerized liquid crystal filament comprising providing a polymerizable liquid crystal monomer, mixing the monomer with a solvent such that the resulting solution exhibits separation from an isotropic phase to a smectic phase and the interfacial energy between the isotropic phase and the smectic phase has a negative anisotropy, inducing filament formation, and polymerizing the filament.

BRIEF DESCRIPTION OF THE DRAWINGS

The FIG. 1 is a micrograph of a polymerized filament segment.

PREFERRED EMBODIMENT FOR CARRYING OUT THE INVENTION

It has now been found that certain smectogenic monomers, when dissolved in an appropriate solvent, can be induced to form polymerizable liquid crystalline filaments. The smectogenic monomer and solvent system is one that can be made unstable against phase separation such that when it separates into a solvent-rich and liquid-crystal-rich phase, the interfacial energy anisotropy favors smectic layers oriented parallel to the interface. At a molecular level, this layering is believed to be due to the end of a monomer side chain being substantially more compatible with the solvent than the rest of the monomer.

Under these conditions there is a formation of filaments, i.e., concentric cylindrical smectic layers around a common axis. Preferably, filament formation is induced by causing the liquid crystalline solution to go from the isotropic to the smectic phase. Preferably, such a phase transition is induced by cooling from a temperature above the upper temperature defining a miscibility gap to a temperature below the upper temperature, i.e., within the miscibility gap. Other means of inducing a phase transition include the application of external electric or magnetic fields as is known in the art.

In addition to the monomer solute, other solutes, such as other monomers, polymers, surfactants or other liquid crystals, can optionally be added to the solution in order to alter the phase diagram of the solution so that an isotropic to smectic transition can be achieved. Alternatively, to modify the phase diagram, the solvent can consist of a mixture of more than one solvent. These solvents can be either polar or nonpolar, depending on the nature of the monomer, such that a negative interfacial energy anisotropy is produced.

Also, an optional initiator may also be added to the solution. One of ordinary skill in the art will realize that a wide range of initiators are available to chose from, depending on the desired rate of reaction, the temperature of reaction and the reaction products. The initiator can be ionic or a free radical, but for maximum control over the rate and location of polymerization, it is preferable that polymerization occur by photoinitiation. By way of example only, suitable photoinitiators include benzoin ethers, peroxides and benzophenones.

The liquid crystalline monomers of the present invention have a polymerizable terminal group, a central portion and a non-polymerizable terminal group which is capable of filament formation during the phase transition from the isotropic to the smectic phase. Specifically, the polymerizable monomer that forms the filaments of the present invention can be defined by formula (I) wherein $R_1$ can be selected from the group consisting of

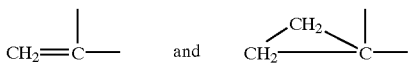

$R_2$ and $R_4$ are each independently selected from hydrogen and organic groups containing from 1 to about 20 carbon atoms; $R_3$ can be selected from the group consisting of a bond, —CH=CH—, benzene, oxygen, sulfur, carboxylate, and

where Y is hydrogen or a lower alkyl group having from 1 to about 8 carbon atoms; $R_5$ is a cyclohexyl or an aromatic group; and $R_6$ is a polar group containing from 0 to about 18 carbon atoms.

The organic groups of $R_2$ or $R_4$ may be saturated hydrocarbons (cyclic or linear) or aromatic hydrocarbons, and may include hetero atoms such as oxygen, sulfur, nitrogen, and halogens. It is preferred that the organic groups contain 1 to about 20 carbon atoms, and more preferably from 1 to about 10 carbon atoms.

$R_6$ preferably has from 0 to about 10 carbon atoms and may contain one or more double bonds. It should also be noted that for purposes of this specification, $R_3$ is defined as a bond when $R_1$ is bound directly to $R_4$.

With reference to those substituents that are independently selected, it should be understood that each substituent is separately selected without reference to any other substituent. Thus, where $R_2$ is an organic group having 4 carbon atoms, $R_4$ can be, for example, an organic group having 6 carbon atoms.

In a preferred embodiment, where $R_1$ is a vinyl group and $R_2$ is a hydrogen atom, the polymerizable monomer is represented by formula (II)

$$CH_2=CH-R_3-R_4-R_5-R_6 \qquad (II)$$

where $R_3$ is selected from a bond, —CH=CH—, benzene, oxygen, nitrogen, sulfur or a carboxylate; $R_4$ has from 1 to about 20 carbon atoms and is selected from vinyl alkyl, vinyl aryl alkyl, vinyl ether alkyl, acrylate alkyl, methacrylate alkyl, diene alkyl and epoxy alkyl; $R_5$ is an aromatic group, preferably biphenyl, phenylcyclohexyl, cyclohexylcyclohexyl, phenylbenzoate, biphenylbenzoate, or phenylpyrimidine; and $R_6$ is a polar group containing from 0 to about 18 carbon atoms.

In another preferred embodiment, where $R_5$ is a pair of bridged rings, the polymerizable monomer is represented by formula (III)

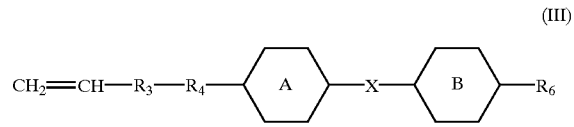

(III)

where $R_3$ is a bond, —CH=CH—, benzene, oxygen, sulfur, nitrogen, or carboxylate; $R_4$ has from 1 to about 20 carbon atoms and is selected from vinyl alkyl, vinyl aryl alkyl, vinyl ether alkyl, acrylate alkyl, methacrylate alkyl, diene alkyl and epoxy alkyl; and $R_6$ is a polar group containing from 0 to about 18 carbon atoms; rings A and B are independently selected from the group consisting of cyclohexyl, phenylene and substituted phenylene; and X is a bridge group selected from a bond, COO, OOC, $CH_2$ $CH_2$, $CH_2O$, CH=CH, N=N, C≡C, C≡C—C≡C, CONH, NHCO, COOS and SOC.

A preferred embodiment of a monomer that forms polymerizable filaments is 4-(1-Octenyloxy)-4-cyanobiphenyl (OOCB), which is represented by the formula (IV)

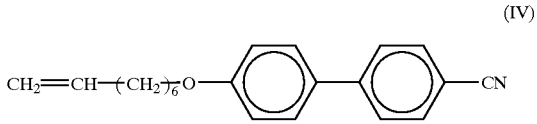

(IV)

The polymerizable monomers employed in the present invention are preferably dissolved in an organic solvent. A useful solution contains from about 0 to about 100 percent by weight monomer, preferably from about 0 percent to about 50 percent monomer, and more preferably, from about 10 to about 30 percent monomer.

The organic solvent employed can include non-polar solvents or weakly polar solvents having from about 2 to about 20 carbon atoms. The non-polar solvents can be selected from hydrocarbons. The weak polar solvents can be selected from alcohols, glycerol, or ethylene glycol.

Preferably, the weak polar solvent is an alcohol having from about 4 to about 20 carbon atoms, such as dodecanol. In addition, solvents may include supercritical fluids such as $CO_2$.

It is envisioned that the filaments of the present invention can be separated from the solution, preferably by a continuous process. Preferably, the solution is allowed to flow through a thermal gradient or other external field gradient. Either before, during or after phase separation, the solution is preferably irradiated to cause polymerization. By way of example only, the filaments can then be used for mechanical reinforcement, they can be used in optical wave guides by being the core of optic fibers, or they can be used in microelectronics by coupling light signals.

Experimental

In order to demonstrate the practice of the present invention, the following solution was made, filament formation was induced, and the resulting filaments were polymerized. The examples set forth hereinbelow, however, are not to be viewed as limiting the disclosure.

A polymerizable monomer, OOCB, was synthesized by adapting the well-known Mitsunobu reaction methodology as follows. Under anhydrous conditions, 1.39 g 1-decenol, 3.0 g triphenyl phosphine and 1.95 g 4-hydroxy-4'-cyano-biphenyl were dissolved in 20 Ml of dry THF and then cooled on an ice bath. To the stirred mixture a solution of 3 Ml diethyl azodicarboxylate in 20 mL of dry THF was added slowly. The resultant mixture was stirred at room temperature overnight. The THF was evaporated and the remaining material was purified by silica gel column chromatography with hexane and ethyl acetal (4:1) as the eluent. The product obtained was a white solid.

The monomer was then dissolved in dodecanol to produce a monomer solution of about 15–20%. To induce filament formation, the monomer solution was cooled from about 64° C. at a rate of approximately 5° C. per minute. Filament formation was observed at about 62° C.

Polymerization was then initiated using an Oriel 6283 UV lamp, with intensity 0.4–0.2 W/cm$^2$, for several minutes. A micrograph of the polymerized filament segment is depicted in the figure.

Based upon the foregoing disclosure, it should now be apparent that the use of the method described herein will carry out the objects set forth hereinabove. It should also be apparent to those skilled in the art that the method of the present invention can be practiced to manufacture polymerized filaments.

It is, therefore, to be understood that any variations evident fall within the scope of the claimed invention and thus, the selection of specific monomers can be determined without departing from the spirit of the invention herein disclosed and described. Moreover, the scope of the invention shall include all modifications and variations that may fall within the scope of the attached claims.

What is claimed is:

1. An article of manufacture comprising a polymerized liquid crystal filament formed as a result of an isotropic to smectic phase transition, and having a repeating monomer unit represented by formula I

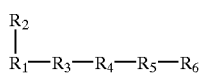

wherein $R_1$ is selected from the group consisting of

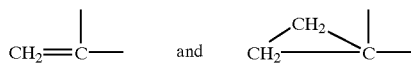

$R_2$ is selected from hydrogen and organic groups containing from 1 to about 20 carbon atoms; $R_3$ is selected from the group consisting of a bond, —CH=CH—, benzene, oxygen, sulfur, carboxylate, and

where Y is hydrogen or a lower alkyl group having from 1 to about 8 carbon atoms; $R_4$ is selected from organic groups containing from 1 to about 20 carbon atoms; $R_5$ is a cyclohexyl or an aromatic group and R6 is a polar group containing from 0 to about 18 carbon atoms.

2. An article of manufacture according to claim 1 wherein said repeating monomer unit is represented by formula (IV)

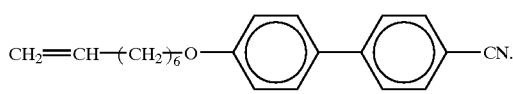

3. The liquid crystal filament according to claim 1, wherein the repeating monomer unit is represented by formula (III)

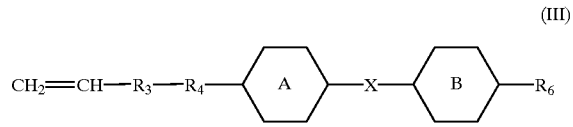

wherein rings A and B are independently selected from the group consisting of cyclohexyl, phenylene and substituted phenylene; and X is a bridge group selected from a bond, COO, OOC, CH$_2$—CH$_2$, CH$_2$—O, CH=CH, N=N, C=C, C=C—C=C, CONH, NHCO, COOS, and SOC.

4. The liquid crystal filament according to claim 1, wherein the repeating monomer unit is represented by formula (II)

5. A polymerizable liquid crystalline monomer comprising:

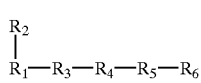

wherein $R_1$ is

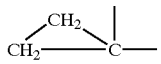

$R_2$ is selected from hydrogen and organic groups containing from 1 to about 20 carbon atoms; $R_3$ is selected from the group consisting of a bond, —CH═CH—, benzene, oxygen, sulfur, carboxylate, and

where Y is hydrogen or a lower alkyl group having from 1 to about 8 carbon atoms; $R_4$ is selected from organic groups containing from 1 to about 20 carbon atoms; $R_5$ is a cyclohexyl or an aromatic group and $R_6$ is a polar group containing from 0 to about 18 carbon atoms; with the proviso that when $R_6$ is —CN, and when $R_5$ is a group represented by formula (V) or formula (VI), then $R_3$ and $R_4$ together do not form an unsubstituted alkyl subunit; and wherein the monomer forms at least one filament as a result of a phase transition

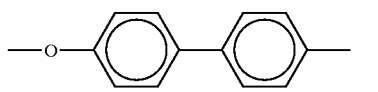 (V)

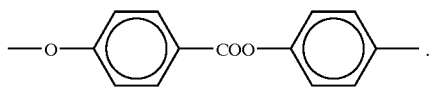 (VI)

6. The monomer according to claim 5, wherein $R_2$ is an organic group containing from 1 to about 10 carbon atoms; $R_4$ is an organic group containing from 1 to about 10 carbon atoms; $R_5$ is selected from the group consisting of biphenyl, phenylcyclohexyl, cyclohexylcyclohexyl, phenylbenzoate, biphenylbenzoate, and phenylpyrimidine; and $R_6$ is a polar group containing from 0 to about 10 carbon atoms.

7. A method of making a polymerized liquid crystal filament comprising:

providing a polymerizable liquid crystal monomer;

mixing the monomer with a solvent such that a resulting solution exhibits separation from an isotropic phase to a smectic phase;

inducing filament formation; and polymerizing the filament.

8. The method according to claim 7, wherein said polymerizable liquid crystal monomer is represented by formula I

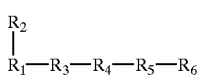 (I)

wherein $R_1$ is selected from the group consisting of

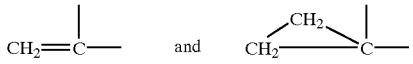

$R_2$ is selected from hydrogen and organic groups containing from 1 to about 20 carbon atoms; $R_3$ is selected from the group consisting of a bond, —CH═CH—, benzene, oxygen, sulfur, carboxylate, and

where Y is hydrogen or a lower alkyl group having from 1 to about 8 carbon atoms; $R_4$ is selected from organic groups containing from 1 to about 20 carbon atoms; $R_5$ is a cyclohexyl or an aromatic group and $R_6$ is a polar group containing from 0 to about 18 carbon atoms.

9. The method according to claim 8, wherein $R_2$ is an organic group containing from 1 to about 10 carbon atoms; $R_4$ is an organic group containing from 1 to about 10 carbon atoms; $R_5$ is selected from the group consisting of biphenyl, phenylcyclohexyl, cyclohexylcyclohexyl, phenylbenzoate, biphenylbenzoate, and phenylpyrimidine; and $R_6$ is a polar group containing from 0 to about 10 carbon atoms.

10. The method according to claim 8, wherein said polymerizable liquid crystal monomer is represented by formula (II)

$$CH_2{=}CH{-}R_3{-}R_4{-}R_5{-}R_6 \quad (II)$$

11. The method according to claim 8, wherein the polymerizable liquid crystal monomer is represented by formula (III)

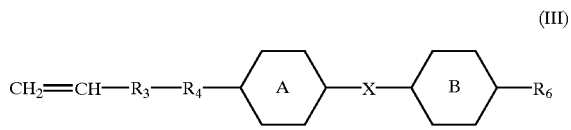 (III)

wherein rings A and B are independently selected from the group consisting of cyclohexyl, phenylene and substituted phenylene; and X is a bridge group selected from a bond, COO, OOC, $CH_2$—$CH_2$, $CH_2$—O, CH═CH, N═N, C≡C, C═C—C═C, CONH, NHCO, COOS, and SOC.

12. The method according to claim 7, wherein the filament is produced by a continuous process.

13. The method according to claim 7, wherein the polymerizing step comprises a step of photoinitiation.

14. The method according to claim 7, wherein the step of inducing comprises the step of cooling the solution from a first temperature above an upper temperature of a miscibility gap to a second temperature below the upper temperature.

15. The method according to claim 7, wherein the step of inducing comprises the step of applying an external field to the solution.

* * * * *